May 28, 1940.
S. M. NAMPA
2,202,316
CROSSING PROTECTIVE SYSTEM
Filed Nov. 30, 1936
9 Sheets-Sheet 1
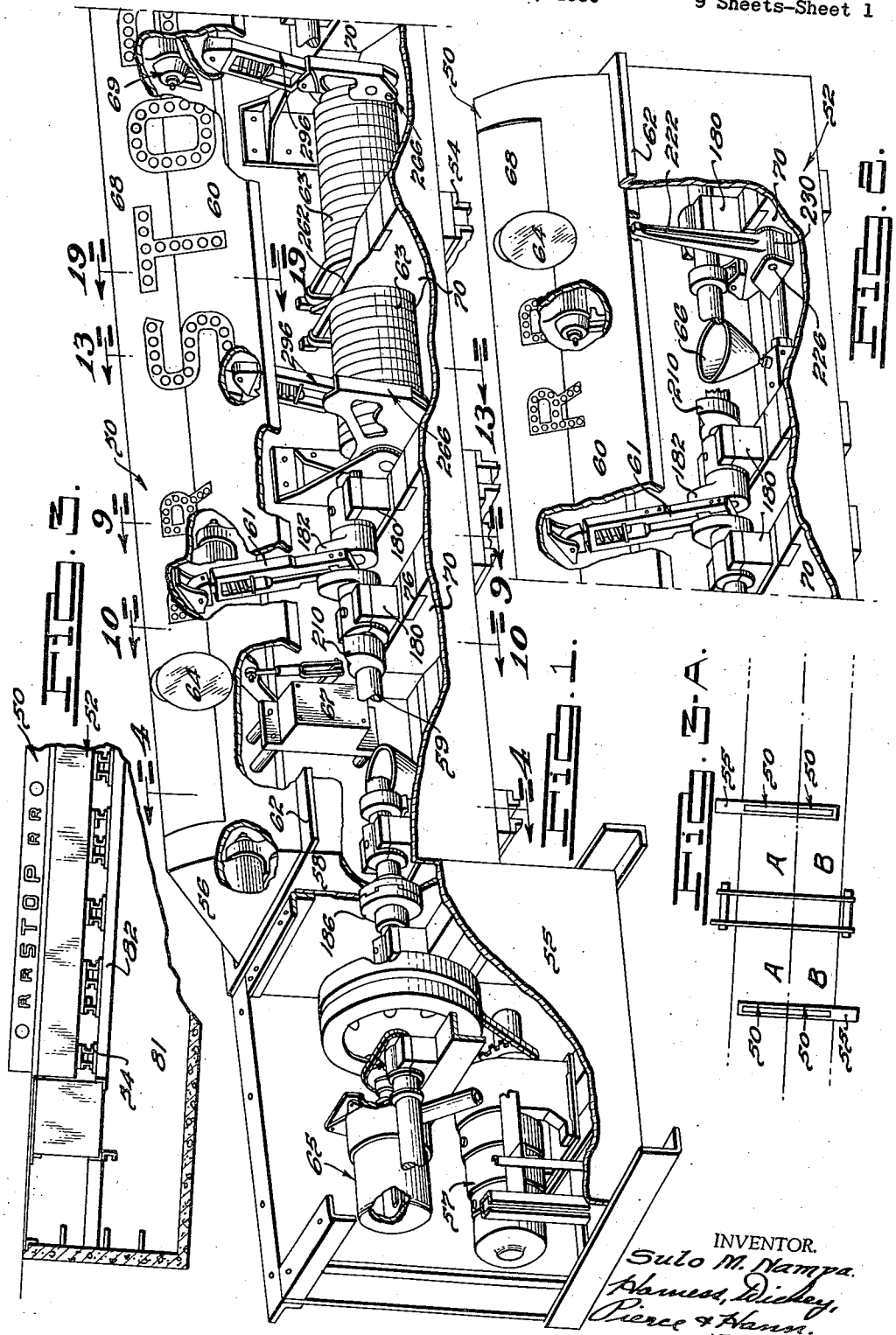
INVENTOR.
Sulo M. Nampa.
Harness, Dickey,
Pierce & Hann.
ATTORNEYS

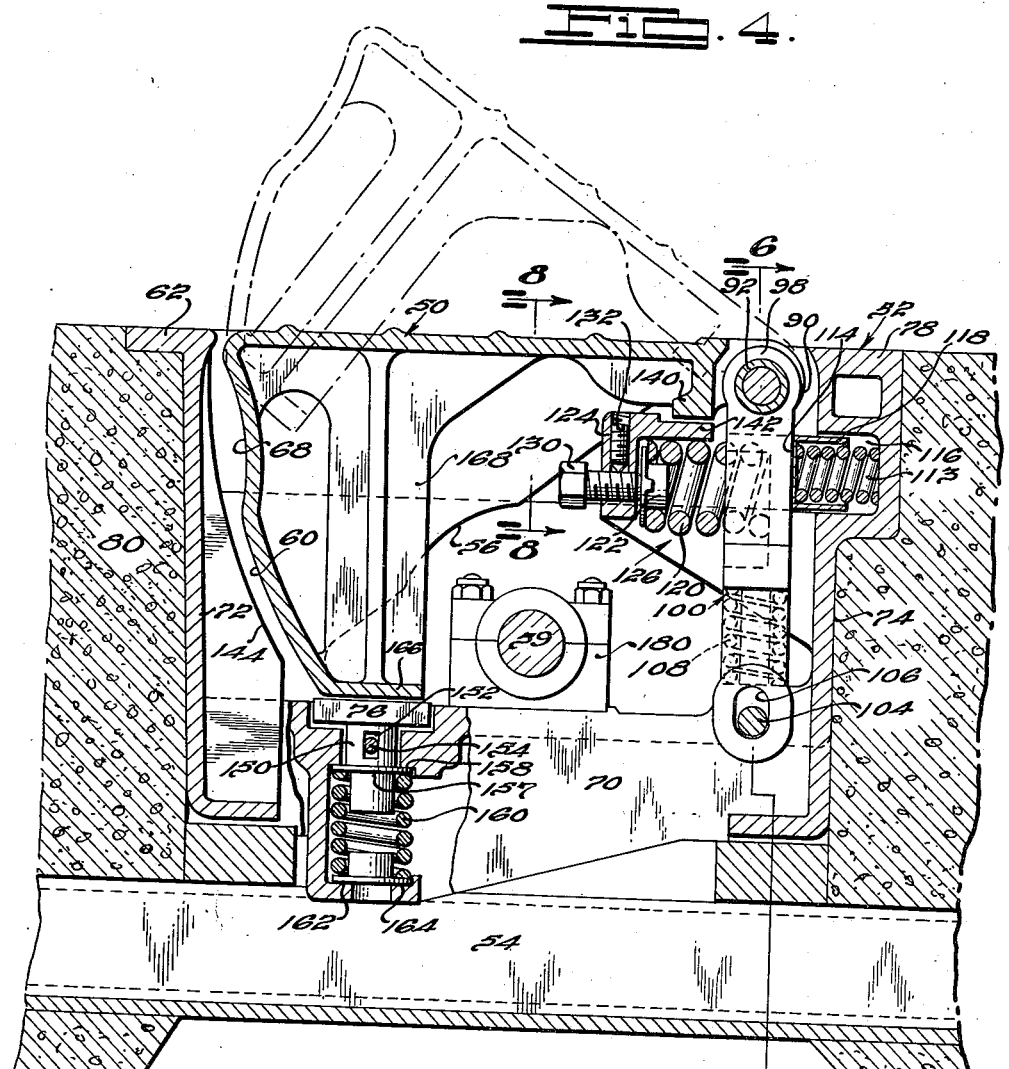
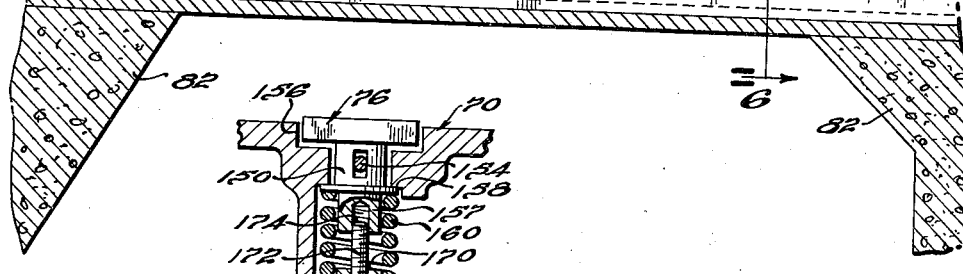

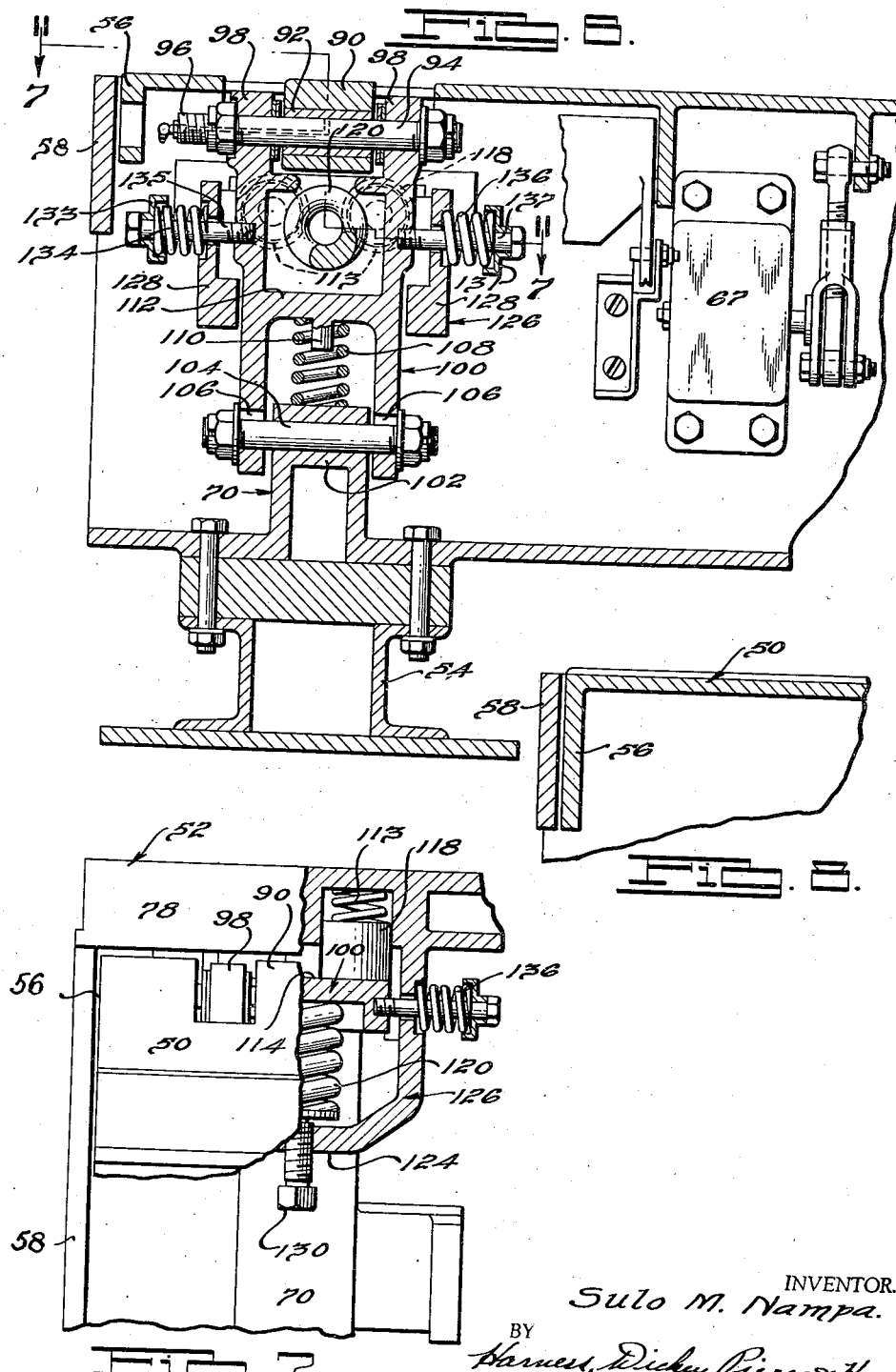

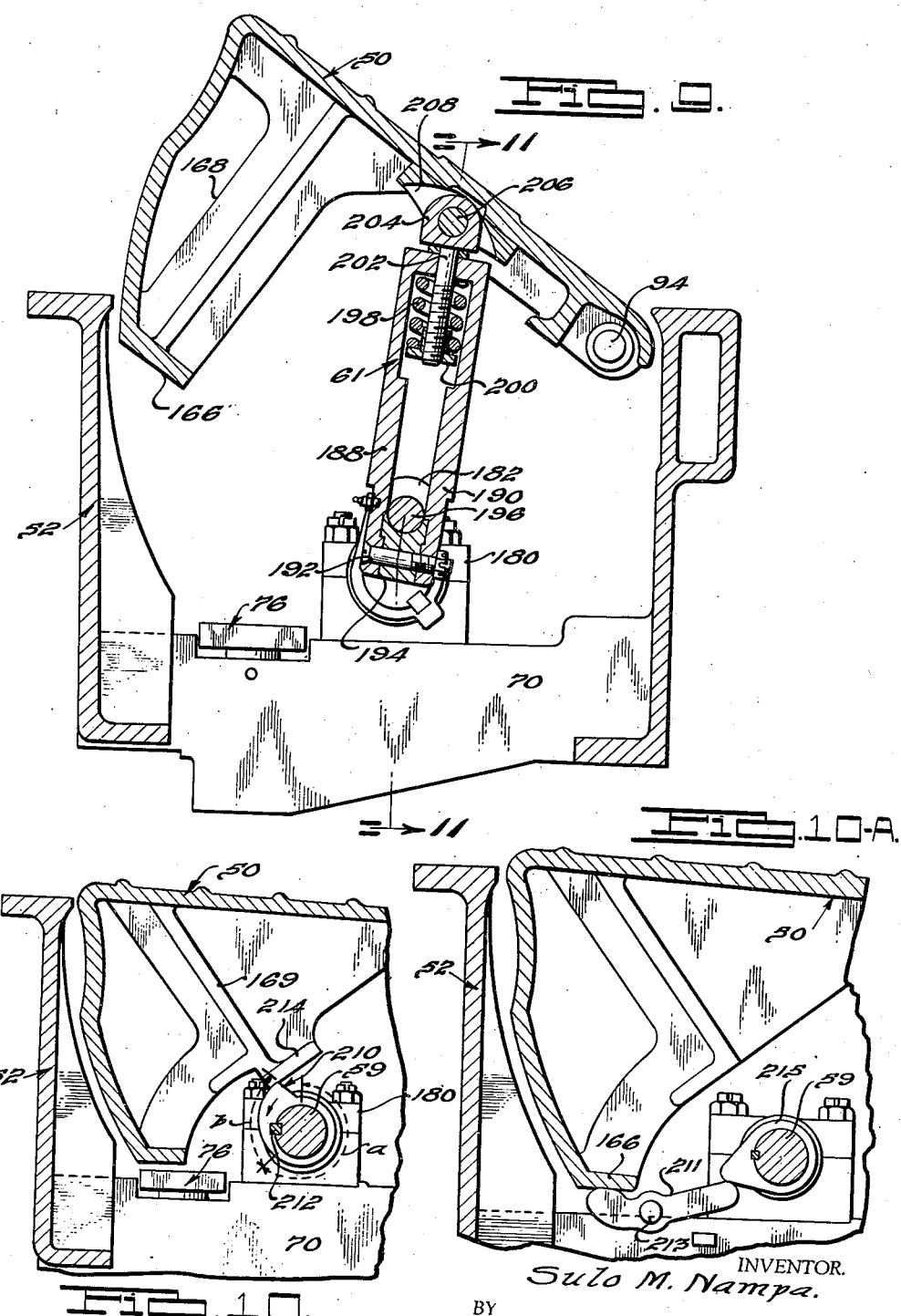

May 28, 1940.  S. M. NAMPA  2,202,316
CROSSING PROTECTIVE SYSTEM
Filed Nov. 30, 1936   9 Sheets-Sheet 5
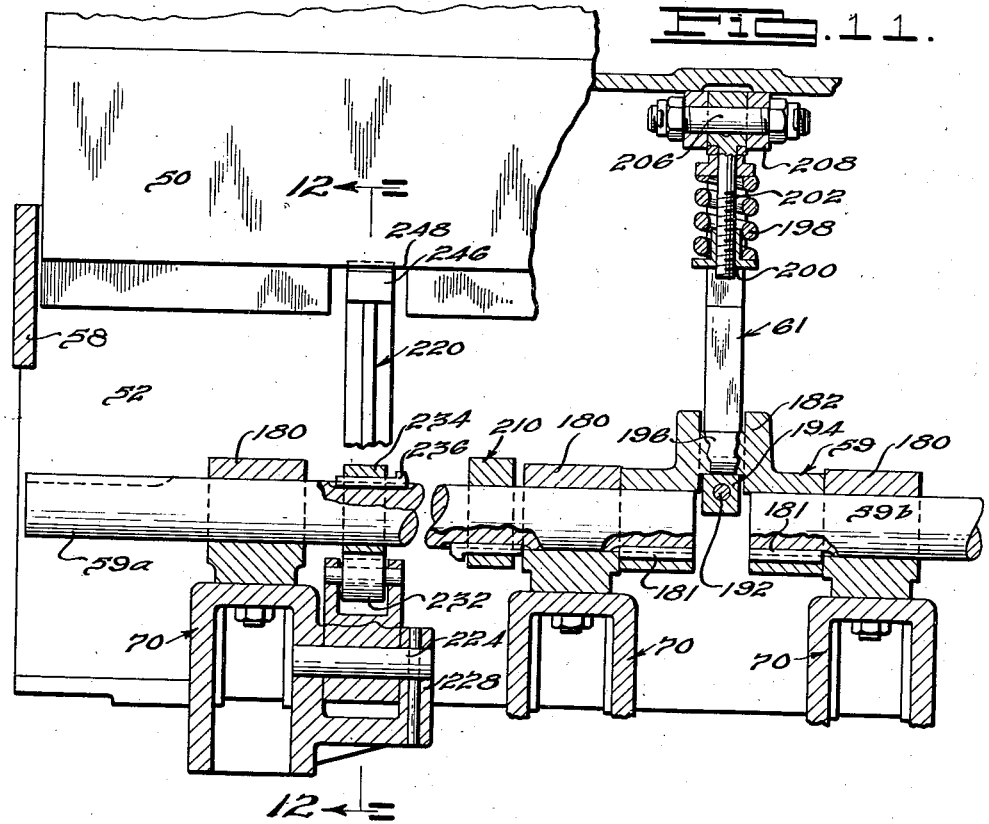
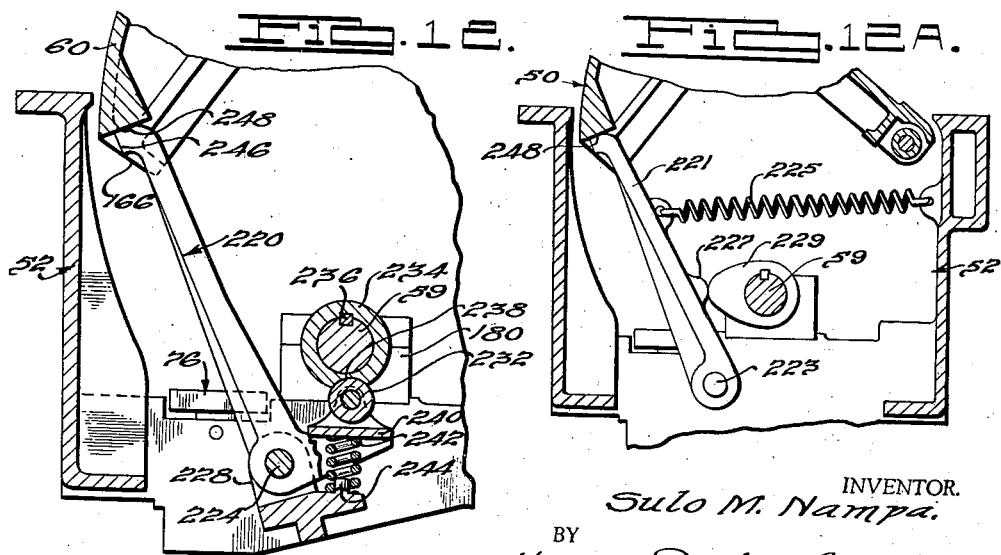
INVENTOR.
Sulo M. Nampa.
BY
Harness, Dickey, Pierce & Henn.
ATTORNEYS

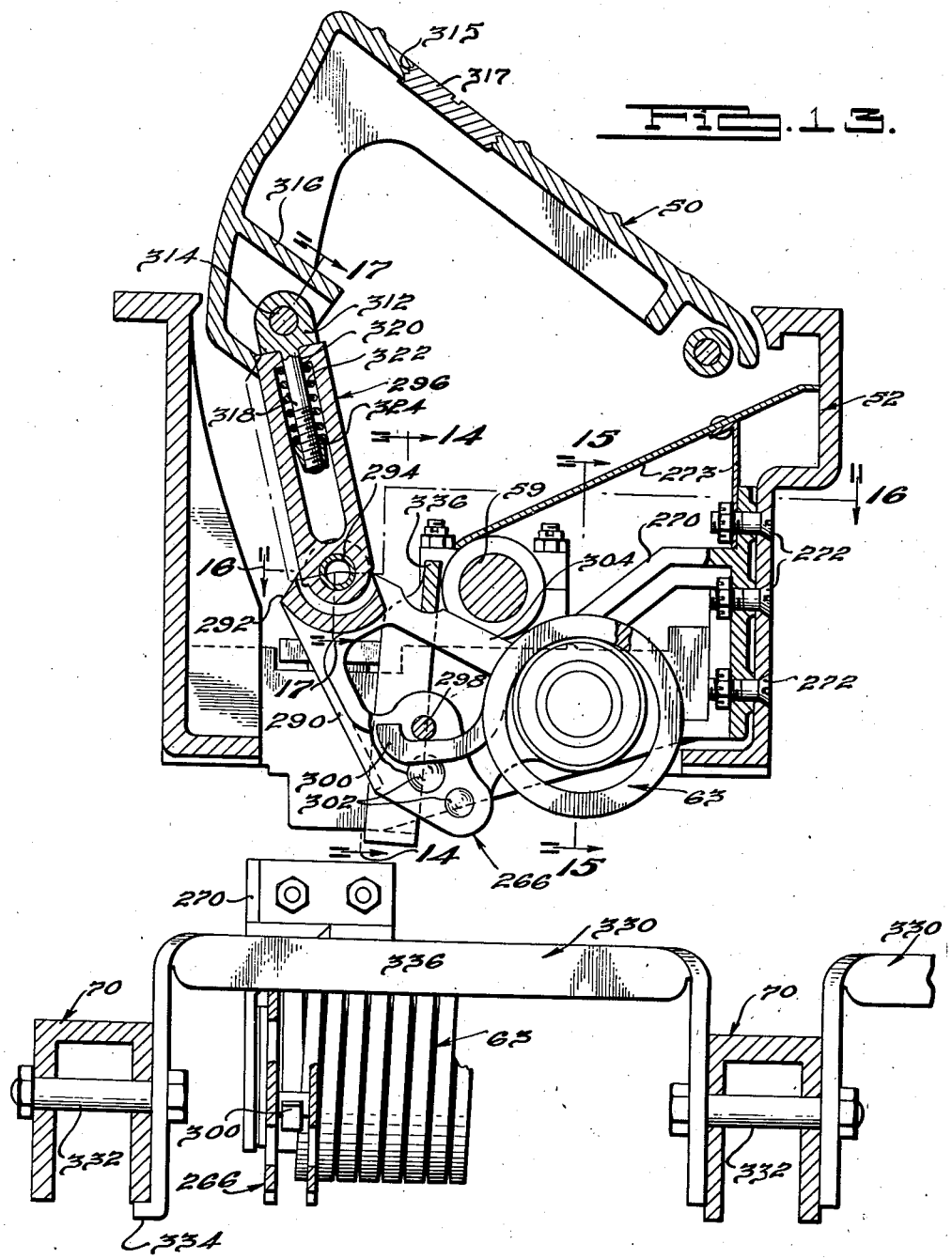

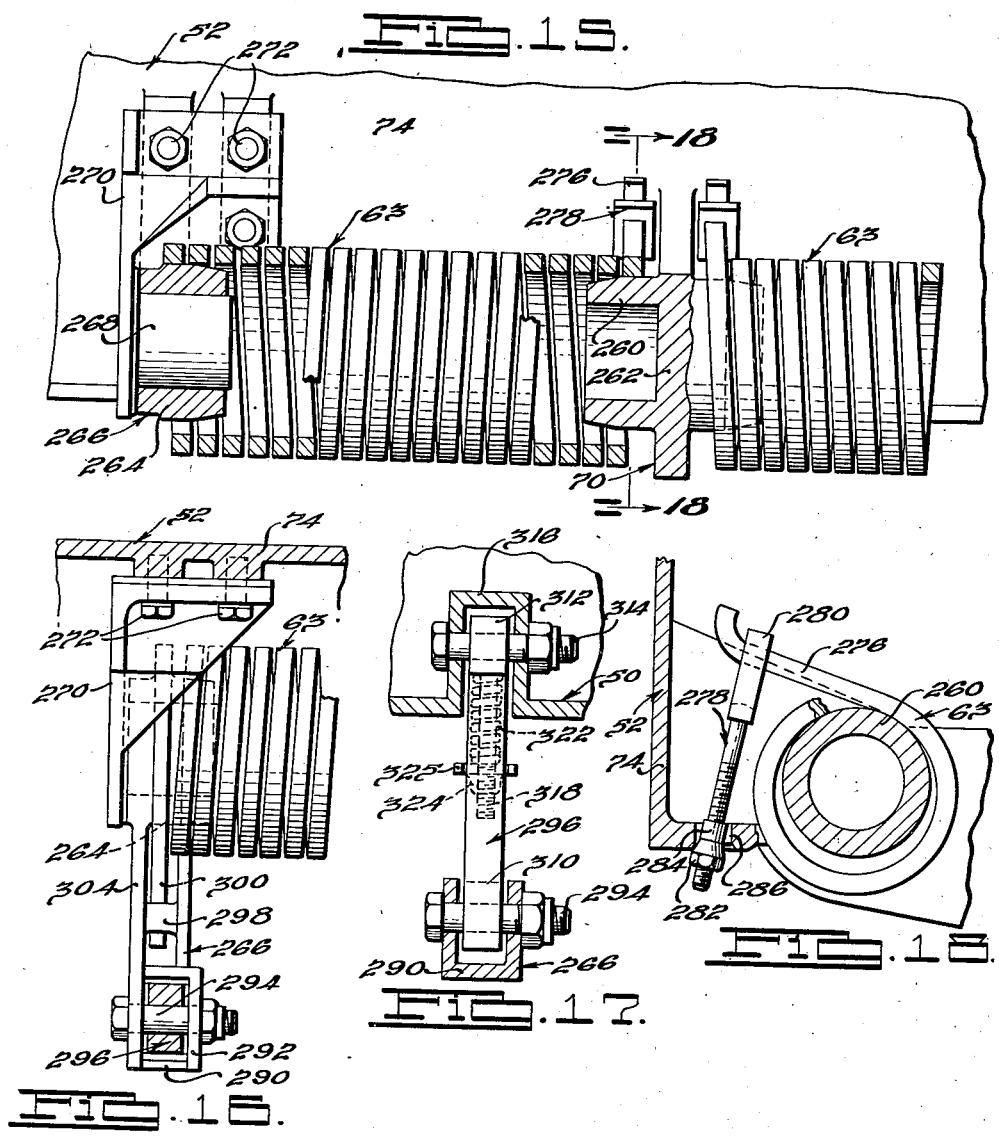

May 28, 1940.                S. M. NAMPA                2,202,316
                       CROSSING PROTECTIVE SYSTEM
                         Filed Nov. 30, 1936        9 Sheets-Sheet 8
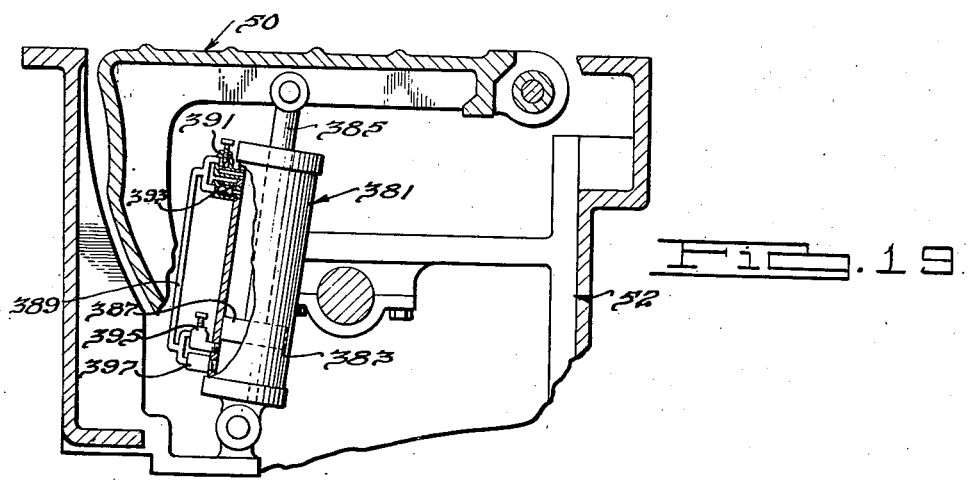
INVENTOR.
Sulo M. Nampa.
BY
Harness, Dickey, Pierce & Hann.
ATTORNEYS.

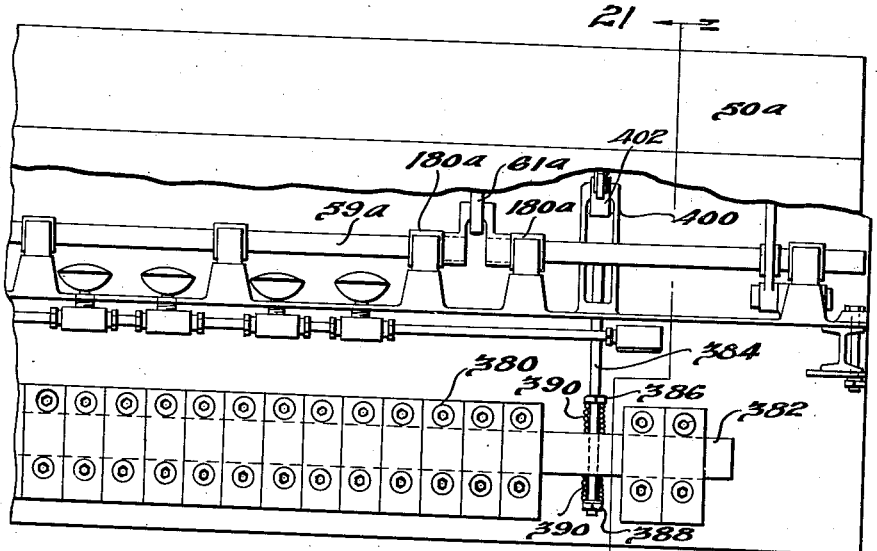
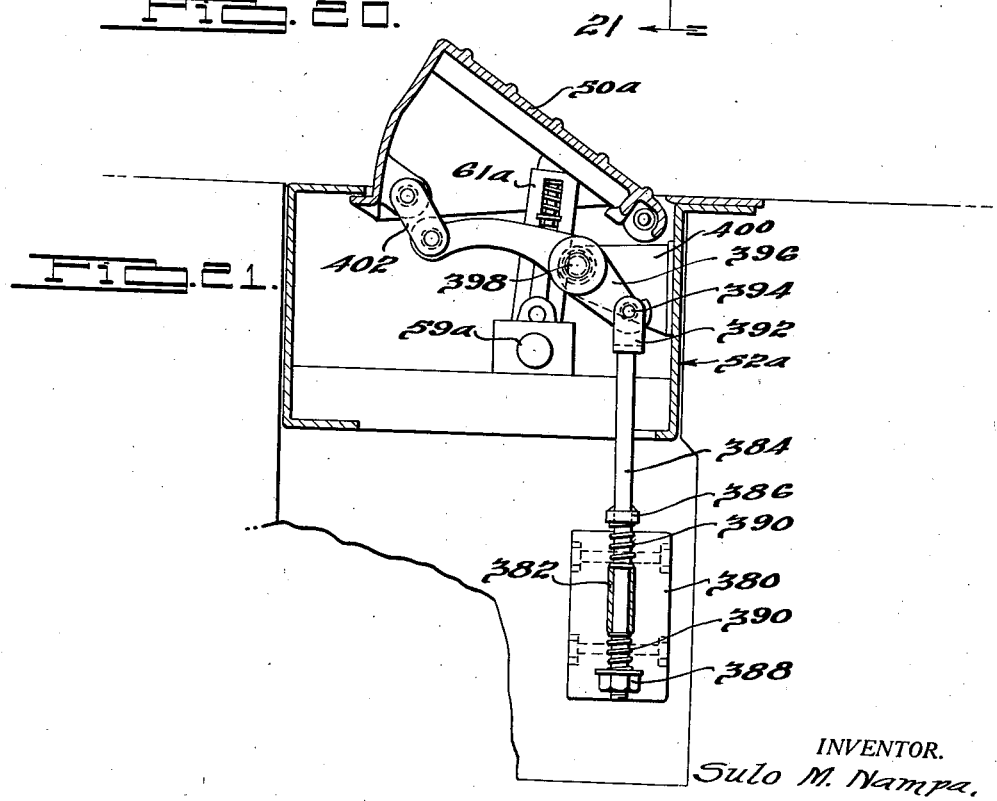

Patented May 28, 1940

2,202,316

UNITED STATES PATENT OFFICE 2,202,316

CROSSING PROTECTIVE SYSTEM

Sulo M. Nampa, Detroit, Mich., assignor to Grade Crossing Guard Corporation, Memphis, Tenn., a corporation of Tennessee Application November 30, 1936, Serial No. 113,410

11 Claims. (Cl. 39—6)

The present invention relates to crossing protective devices of the barrier type, that is, of the type in which a retractable and projectable barrier is supported in a pit in a roadway or other area to be protected, and may be automatically or otherwise projected to a blocking position and retracted therefrom under predetermined operating conditions.

Objects of the present invention are to provide an improved barrier protective system of the above identified type, so constructed and arranged as to insure proper operation under all conditions, and which may be relatively economically manufactured, assembled, and installed.

More specific objects of the present invention are to provide a protective system of the above stated character, embodying a plurality of barrier devices, the projecting movements of which are effected by continuously acting mechanism associated therewith, and the retracting movements of which are provided by positive driving mechanism associated therewith; to provide such a system in which the projecting movements may be effected by weight operated mechanism; to provide such a system in which the retracting mechanism embodies crank shaft elements suitably connected to the barrier devices, and effective to control the rate of the projecting movement; and to provide such a system in which the connections between the projecting elements and the barriers, and the connections between the retracting elements and the barriers are resilient.

Further objects of the present invention are to provide a barrier system as above described, including improved means to enable the retracting mechanism to apply a positive lifting force to the barriers under certain circumstances; to provide such a system in which the just stated force is applied through one or more cams associated with the barrier crank shafts and disposed to positively force the same upwardly; to provide such a system in which the cams are normally spaced from the cooperating parts of the barrier to permit floating movements of the latter independently of the cams; to provide such a system embodying one or more bell crank members disposed for rotation by the cams and to engage the barriers; and to provide such a system in which the cams engage the bell cranks only during a limited portion of the rotation of the cams, and so are ineffective to cooperate with the bell cranks except during a predetermined initial portion of the barrier projecting movements.

Further objects are to provide such a system embodying improved means for locking the barriers in projected position; to provide such locking means embodying one or more pivotally mounted arms, responsive to the barrier position, and swingable into and out of locking engagement with the barriers; to provide such a system in which the connections between the barriers and the retracting mechanism are of a lost motion type, permitting the barriers to be forcibly depressed against the forces of the lifting means, independently of the positions of the retracting elements; to provide such a system embodying snubber mechanism to limit the speed of movement of a barrier.

With the above and other objects in view, which appear in the following description and in the appended claims, preferred but illustrative embodiments of the present invention are shown in the accompanying drawings, throughout the several views of which corresponding reference characters are used to designate corresponding parts, and in which:

Figures 1 and 2, taken together with Figure 2 considered as positioned to the right of Figure 1, comprise a view in perspective, with certain of the parts broken away, of the crossing barrier of the present invention;

Figure 3 is a fragmentary view in front elevation of the improved barrier, showing the structural supporting elements associated therewith;

Figure 3A is a schematic view, illustrating the disposition of barriers at a railroad crossing;

Figure 4 is a view in vertical section, taken along the line 4—4 of Figure 1, showing details of the hinging and buffer construction;

Figure 5 is a fragmentary view in vertical section, illustrating further details of a buffer shown in Figure 4;

Figure 6 is a view in vertical section, taken along the line 6—6 of Figure 4, showing further hinging details;

Figure 7 is a fragmentary view, partly in section, taken along the line 7—7 of Figure 6;

Figure 8 is a fragmentary view in vertical section, taken along the line 8—8 of Figure 4;

Figure 9 is a view in vertical section, taken along the line 9—9 of Figure 1, showing details of a crank connecting arm;

Figure 10 is a fragmentary view in vertical section, taken along the line 10—10 of Fig. 1.

Figure 10A is a fragmentary view, corresponding to Figure 10, and showing a modified "icebreaker" construction;

Figure 11 is a view, partly in vertical section, taken along the line 11—11 of Figure 9;

Figure 12 is a view in vertical section, taken along the line 12—12 of Figure 11, showing details of the locking arm;

Figure 12A is a fragmentary view corresponding to Figure 12 and showing a modified locking construction.

Figure 13 is a view in vertical section, taken along the line 13—13 of Figure 1, showing details of the torsion lifting springs;

Figure 14 is a view in vertical section, taken along the line 14—14 of Figure 13;

Figure 15 is a view principally in vertical section, taken along the line 15—15 of Figure 13;

Figure 16 is a fragmentary view in section, taken along the line 16—16 of Figure 13;

Figure 17 is a fragmentary view in section, taken along the line 17—17 of Figure 13;

Figure 18 is a fragmentary view in vertical section taken along the line 18—18 of Figure 15;

Figure 19 is a fragmentary view in vertical section, taken along the line 19—19 of Figure 1, showing details of the snubber structure·

Figure 20 is a fragmentary view in elevation of a weight actuated embodiment of the present invention; and Figure 21 is a view in vertical section, taken along the line 21—21 of Figure 20.

*General description—Figures 1, 2, 3, and 3A*

Referring first to Figures 1, 2, 3, and 3A, each barrier device comprises generally a barrier 50 which is projectably and retractably supported in a casing 52, supported upon beams 54 extending transversely thereof, and which are suitably imbedded in a pit formed in the roadway with which the device is associated. Preferably, as shown in the diagrammatic view, Figure 3A, each crossing installation includes at least four of the devices, two thereof being mounted at each side of the protected intersection. Each of the illustrated traffic lanes A and B (Figure 3A) is thus provided with two of the devices, one thereof being at the entering side of the intersection and the other thereof being at the departing side of the intersection. In certain instances, it is found practicable to protect only the entering side. Generally, however, it is found advisable to protect each lane at both the entering and departing sides, in order to prevent an oncoming vehicle from avoiding the barrier by swerving out of the regular lane of travel. All barriers at each side of an intersection are connected together for common control by a single drive unit 55 individual to such side.

In Figure 3A also, it is assumed that each device is sufficiently wide to protect its entire associated lane. To accommodate the devices to lanes of greater width, it will be appreciated that the lengths of the individual devices may be increased. Alternatively, the devices may be made in a variety of different lengths, and two or more thereof connected in end to end relation to accommodate roadways of too great a width to be handled conveniently by a single device per lane. A feature of the present construction is the ready adaptability of the barriers for such end to end duplication, and the adaptability thereof for connection at either end to the driving unit.

As an aid in appreciating the following detailed descriptive matter, the operation as a whole of the device may be briefly summarized as follows:

The approach of a train or other vehicle to the crossing with which the devices are associated, and the approach of which is designed to actuate the device, completes the circuit for the driving motor 57 associated with the drive unit at each side of the intersection. Each motor accordingly releases a brake associated therewith and starts, thereby rotating the crank shaft 59 connected thereto, which crank shaft is connected to the barriers 50 through a plurality of connecting arms 61. This action permits a plurality of torsion springs 63, associated with each barrier, to force the latter upwardly, during which movement it rotates about the pivotal connection between the rear corner thereof and the casing. After a short initial raising movement, sufficient to bring the warning indicia on the face of the barrier into view, a controller 65 individual to each drive unit interrupts the motor circuit and applies the brake thereof, bringing the barriers to rest in an initial or warning position. After a suitable predetermined interval, determined by suitable timing mechanism, each controller 65 again places the associated motor 57 in operation, continuing the upward movements of the barriers. At the upper limit position, each motor 57 is automatically stopped by the associated controller 65. Upon reaching the limit position also, the barriers associated with on-coming lanes are automatically locked in the raised position. The barriers associated with outgoing lanes are preferably not locked, so that they may be depressed to permit movement of vehicles thereover. Preferably, also, the outgoing barriers are lifted to only an intermediate height, limit stops being provided for this purpose.

As the actuating vehicle leaves the intersection, motor 57 is again started in the original direction and, through the arms 61, pulls each connected barrier downwardly in a single, continuous movement, to its original position, against the force of the torsion springs 63. Upon reaching the original position, each motor 57 is again brought to rest by the action of the associated controller 65.

Each barrier may thus be broadly characterized as one which is raised through the influence of the torsion springs associated therewith and which is lowered through the force directly applied thereto through the driving unit. The connection between the driving unit and each barrier is a lost motion one, so that the barrier may be depressed against the force of the torsion spring during the raising rotation of the drive unit, at any time between the initial movement thereof and the time that the limit position locking mechanism is rendered effective. Snubbers 69 are provided to prevent a too rapid or a too high rise of each barrier following such a depression.

The initial lifting movement of each barrier actuates a limit switch 67 individual to each device, which controls the circuit for usual crossing traffic warning lights. The barrier control systems are also so arranged that the barrier movement is accompanied by the actuation of a plurality of lamps 66 located in the casing, and which, in conjunction with suitable reflectors, act to illuminate the warning indicia located on the face of each device. These lights remain lighted in continuously flashing relation from the time of initial actuation thereof until the barrier reaches a corresponding point in its downward or return movement.

The drive units per se and the control systems therefor form the subject matter of the copending application, James M. Evans, Serial No. 109,941, filed November 9, 1936, and assigned to the assignee of the present application.

The warning light structure for the barriers and the control system therefor form the subject matter of copending application of James M. Evans, Serial No. 108,150, filed October 29, 1936, and assigned to the assignee of the present application.

Certain of the broader aspects of the present construction are disclosed and claimed in the copending application of William G. Miller, Serial No. 125,081, filed February 10, 1937, and certain of the detailed features disclosed herein are claimed in the copending application of James M. Evans, Serial No. 108,149, filed October 29, 1936, both of which are assigned to the assignee of the present application.

*Barrier and casing construction—Figures 1, 2, 3 and 4*

Each barrier 50 is preferably formed as a single, elongated, shell-like casting, generally triangular in shape in vertical transverse section, the back of which is enclosed to form a part of the roadway when the barrier is in depressed position, and the generally arcuate front of which is enclosed to form an impact portion and a protective skirt portion. The ends are also preferably enclosed to constitute protective skirts. The under side is preferably open to accommodate the operating elements associated with the barrier. Each enclosing end skirt 56 of each barrier 50 lies closely adjacent the associated end 58 of the casing 52, and so acts to prevent dirt and other foreign matter from falling into the casing when the barrier is in the raised position. The forward skirt portion 60 lies closely adjacent the forward, upper edge lip 62 of the casing when the barrier is in raised position and performs a corresponding function. The rectangular dimensions of each barrier 50 and casing 52 are such that in the retracted position, only very small spaces are left around the barrier edges, thus minimizing the entrance of dirt and other foreign matter into the casing.

As described in more detail in the above application, Serial No. 108,150, filed October 29, 1936, the forward face of each barrier is provided with suitable warning indicia, such as the letters RR and the word STOP preferably outlined in reflecting buttons. Cutouts are also provided to receive large lenses 64. The lenses are preferably supplied from light sources individual thereto and illustrated as comprising a pair of lamps 66 disposed at either end of the casing adjacent the base thereof. Light from the lamps 66 is reflected from a pair of moving reflectors and the lenses 64, which reflectors move in accordance with the movements of the barrier. Thus, a substantially uniform angle of incidence is maintained between the roadway and the light transmitted through the lenses. Preferably, the arrangement is such that the light transmitted from the barrier is confined within a relatively narrow band. Accordingly, as the barrier moves upward as hereinafter described, a driver of an on-coming vehicle is confronted with a substantially continuous band of red or other colored light, extending entirely across the roadway and providing a highly effective warning.

The impact portion 68 of each barrier is preferably reversely formed, to present an arcuate engaging surface. The arcuate curvature is preferably such that a substantial area is engaged by a tire of a vehicle which engages the barrier. The inclination of the engaging portion 68 in its relation to the heighth of the barrier, is determined in accordance with the disclosure of the copending application of Edward S. Evans, Serial No. 33,037, filed July 25, 1935, now Patent No. 2,075,892 and assigned to the assignee of the present application. As disclosed and claimed in this copending application, by properly relating the heighth and inclination of the engaging face of the barrier, a construction results which, when engaged by a vehicle, forces the front end of the vehicle upwardly with a force sufficient to substantially counter-act the forward thrust which would otherwise be given an occupant of the vehicle. Vehicles may thus be stopped by the barriers without injury to occupants of the vehicles.

Each casing 52, one of which, as previously stated, is individual to each barrier 50, is preferably formed of an elongated rectangular box-like casting, open at the top and at the bottom and disposed to be supported in the roadway pit upon the previously identified, transversely extending, beams 54. A plurality of transverse, inverted, channel shaped ribs 70 extend between the forward and rear walls 72 and 74 of each casing, and, in cooperation with the hereinafter more fully described buffers 76 carried thereby, act to support the lower edge of the arcuate front face of the associated barrier when the latter is in the retracted position. The lips 62 and 78, associated with the forward and rear upper edges of each casing 52, cooperate with the supporting masonry 80 in maintaining the upper surface of each casing 52 in a flush relation to the roadway.

Each device, including a barrier 50 and a supporting casing 52, is preferably shipped to the point of installation in a completely assembled condition. A preferred method of erecting the thus previously assembled device consists in providing the pits in the roadway with a masonry footing 82, which forms a substantial and firm support for the beams 54, which carry the casing 52. After thus being preliminarily positioned, the masonry 80 may be poured around each casing 52 at the front and rear sides thereof. In certain instances, it is desirable to form the pit deep enough to provide a chamber 81 beneath the barrier, to afford access for inspection or repair. In certain other instances, as described hereinafter in more detail, it is desirable to arrange the barriers for access from above.

*Supporting relation between barrier and casing— Figures 1, 2, 4, 5, 6, 7, and 8*

It will be appreciated that, in operation, crossing barriers of the type in question are subjected to an extremely heavy duty. They are required to successfully withstand the impact forces of vehicles of widely varying weights, and traveling at widely varying speeds, and are required to bring said vehicles to rest without permitting the passage thereof into the protected intersection. Each barrier and casing is accordingly subjected to tremendous impact forces.

The forces involved in the successful operation of a protective device of the kind in question have shown it to be inadvisable to utilize a usual hinging relation between each barrier and its supporting casing. The present construction provides a hinging relation between each barrier and its supporting case which is such that all impact forces applied to a barrier are transmitted directly from the barrier to the supporting walls or ribs of the casing, and are not transmitted through the elements which form the pivotal connection between the casing and the barrier.

Referring particularly to Figures 4, 6, 7, and 8, the rear edge of each barrier 50 is provided along its length with a plurality of spaced bearing bosses 90, provided with suitable bushings 92, and through which pins 94 are passed. Each pin 94, which may and preferably is provided with a suitable lubricant fitting 96, is journaled in spaced bosses 98 formed at the upper ends of the legs of a spring arm 100. Each spring arm 100 is pivotally connected at its lower end to a boss 102 formed in an associated one of the previously mentioned transverse ribs 70, by means of a pin 104, which passes through the boss 102, and the opposite ends of which are freely received in somewhat elongated slots 106 formed in the lower ends of the legs of the spring arm 100. A compression coil spring 108 is seated between each boss 102 and a pin 110, which depends from a cross web 112 formed in each arm 100. Each spring 108 thus acts to urge its associated arm upwardly so that the lower ends of the arm slots 106 bear against the under side of the associated pin 104. The slots 106, however, permit each arm 100 to be depressed somewhat against the force of the compression springs 108. The arms 100 thus act to floatingly vertically support the rear edge of the barrier 50.

A pair of compression springs 113, associated with each arm 100, act between the back 114 thereof, and the rear casing wall, and serve to continually urge the associated arm 100 in a counter-clockwise direction, as viewed in Figure 4. One end of each spring 113 bears directly against the base of an associated recess 116 formed in the rear casing wall, and the other end thereof is received in a cuplike member 118, which may be suitably secured to the back 114 of the associated arm 100.

Springs 113 are opposed by a single compression spring 120, one end of which bears against the inner face of the back 114 of the associated arm 100, and the outer end of which is fitted over a retaining member 122, which is supported adjacent the web 124 of the U-shaped bracket 126, which is either integrally formed with casing 52 or is suitably secured thereto, with the web 124 thereof spaced inwardly from the rear wall of the casing, and the legs 128 thereof spaced apart sufficiently to receive the associated arm 100. The position, and hence the initial compression of spring 120 is adjustable by means of an adjusting screw 130, which may be locked in position by a set screw 132. Adjusting screw 130 is preferably adjusted so that in a free condition the barrier 50 is held by springs 120 and the opposing springs 113 in a position such that the rear edge thereof is slightly inwardly spaced from the rear wall of the casing, and the forward face thereof is spaced slightly inwardly from the forward wall of the casing.

Two additional springs 134 and 136, which act in opposing relation to each other, are provided to resiliently balance or secure the barrier 50 in a predetermined longitudinal position. Bolts 135 and 137, threaded into the sides of arm 100, pass freely through the legs 128, and are provided with retainers 133 and 131 which seat the outer ends of springs 134 and 136. The other ends of springs 134 and 136 are seated in recesses provided in the legs 128 of the previously mentioned U-shaped bracket member 126.

With the above described arrangement, it will be evident that each barrier 50, supported at a plurality of points along its length, floats vertically of the casing under the restraining influence of the springs 108, floats transversely of the associated casing under the restraining influence of the opposed springs 113 and 120; and floats longitudinally of the casing under the restraining influence of the opposed springs 134 and 136.

In order that forces striking the barrier of sufficient magnitude to overcome the restraining forces of the previously described balancing springs and thus of sufficient magnitude to displace the barrier in the casing, may be transmitted directly between the barrier and the casing, independently of the hinge pins 94 and 104, abutment means are provided to absorb the vertical, transverse and longitudinal components of such forces.

To absorb vertically directed forces, a foot 140 is formed within the barrier 50 adjacent each boss 90 and which, in the free position of the barrier, occupies a position in slightly spaced relation to the upper surface 142 of the associated U-shaped brackets 126. The spacing between foot 140 and the surface 142 is less than the lost motion in the connection between each arm 100 and the associated pins 104. Accordingly, any vertical force of sufficient magnitude to substantially compress the springs 108, causes the feet 140 to engage the supporting surfaces 142, so that all of the vertical load transmitted between the rear edge of the barrier and the casing is thus transmitted directly between the feet 140 and the supporting surfaces 142. Vertical forces directed against the front edge of the barrier are absorbed by the hereinafter described buffers 76.

Similarly, to absorb any force sufficient to cause the barrier feet to move rearwardly in the casing, or to the right, as viewed in Figure 4, the previously mentioned rear edge rib formation 78 of the casing 52 is made sufficiently heavy to form a positive support for the rear edge of the barrier when engaged thereby. Rearwardly directed forces, acting on the barrier, are thus transmitted between the barrier and the casing through the engagement of the rear edge of the barrier with the rear upper lip formation of the casing. To similarly transmit directly to the housing forwardly directed forces, that is, forces tending to cause the barrier to move forwardly within the housing or to the left, as viewed in Figure 4, a plurality of arcuately formed ribs 144 are provided in spaced relation along the forward wall of the casing, and which extend toward the rear wall. In the free position of the barrier, the arcuate forward face 60 thereof lies in slightly spaced relation to the ribs 144. A forward movement of the barrier, against the resistance of the springs 120, however, brings the forward barrier face 60 directly into engagement with the ribs 144, which constitute a positive limit to such forward motion, and relieves the springs 120 of further load.

Forces acting longitudinally of the barrier, if sufficient to compress one or the other of the springs 134 and 136, brings the ends 56 of the barrier directly into abutting relation to the ends 58 of the casing, which members thus act to directly transmit such longitudinal forces from the barrier to the casing.

Each of the buffer plates 76, one of which is associated with each of the previously mentioned transverse ribs 70, comprises generally a flat upper platelike portion which forms a seat, and a cylindrical boss portion 150 formed integrally with the seat portion and extending downwardly therefrom. An elongated opening 152 extends through the boss portion and forms a lost motion connection with a retaining pin 154 which passes therethrough, and the opposite ends of which are supported in openings (not shown) in the opposite sides of the channel shaped transverse rib 70. Each pin 154 therefore acts to loosely prevent displacement of the associated buffer plates 76 from their supporting ribs. The supporting ribs are each provided with recesses or depressions 156 within which the plate portions of the buffers are somewhat loosely received.

The under side of each boss portion 150 rests upon an upper spring retainer 157, preferably of circular construction, and the upper surface of the marginal edge of which bears against a seat 158 provided therefor in the associated rib 70. A compression spring 160 is seated between each of the upper retaining members 157 and a similarly constructed lower spring retaining member 162, which is supported upon a seat 164 provided therefor in the base of the associated transverse rib 70.

The barrier 50 is provided with an inturned flange 166, which extends throughout the length thereof, and is reinforced at a plurality of spaced points by ribs 168 and by additional ribs 169. In the retracted position of the barrier, the flange 166 rests upon and is supported by the plurality of buffer plates 76, which floatingly retain the barrier in the position of the parts illustrated in Figure 4 under the influence of the supporting springs 160. Any vertical force acting on the front edge of the barrier, however, and forcing the latter downwardly, initially compresses the springs 160. If the force is of sufficient magnitude, it compresses the springs 160 sufficiently to bring the under sides of the plate portions of the buffers 76 into engagement with the bases of the recesses 156 provided therefor in the transverse ribs, which recesses thus form a positive limit to such downward movement and act to transmit such vertical force directly from the barrier to the casing through the ribs 70.

A structural feature of importance in connection with the buffer plates and associated spring mechanism is shown in Figure 5. In Figure 5, which shows the upper and lower spring retainers 157 and 162 in section, the lower spring retainer 162 is provided with a drilled opening 170, large enough to freely pass an adjusting stud 172, the threaded end of which is threadably received in an internally threaded opening 174 provided in the upper spring retainer 157. The base 176 of the transverse rib 70 is provided with an opening 178 sufficiently large to freely pass the head of the adjusting stud 172. In assembling the parts, the buffer plate 76 is first freely dropped into the recess 156 provided therefor in the transverse rib. Thereafter, the pin 154 is inserted in place. As a preliminary to inserting the spring 160, the adjusting stud is turned into the opening 174 sufficiently far to compress the spring 160 and bring the two spring retainers 157 and 162 sufficiently close to each other that the assembly comprising the spring and the two retainers may be freely slipped between the base of the buffer plate and the upper surface of the portion 176. The final assembly step may consist in withdrawing the adjusting stud 172 sufficiently far to permit the spring 160 to expand and force the lower retainers against the portion 176 and force the upper retainers in the seat 158.

*Retracting mechanism, including crank shaft and connecting arms—ice breakers and locking arms—Figures 1, 2, 9, 10, 11, 12*

As previously stated, in a general way, each barrier 50 is provided with a crankshaft 59 which extends longitudinally therethrough, and has a lost motion connection with each of a plurality of arms 61, which are respectively pivotally connected to the upper surface of the barrier. The crank shafts are actuated by the drive units 55 and one complete revolution of each thereof is effective to permit one complete raising movement under the influence of the previously mentioned torsion springs 63 and a complete retracting movement, approximately 180 degrees of travel being involved in each of the projecting and retracting movements. The lost motion connection between each crank shaft and its associated connecting arm permits the barrier to be retracted against the force of the torsion springs, independently of the crank shaft movement. It also permits the barrier movement to be interrupted at any point in its travel, independently of the crank shaft movement, so that the upper limit of travel of a barrier may be determined independently of the throw of the associated crank shaft. During travel of the crank shaft in the lowering 180 degrees of movement, however, the offsets positively engage the connecting arms and correspondingly positively effect a barrier retracting movement.

As shown generally in Figures 1 and 2, and in greater detail in Figures 9 and 11, the crank shaft 59 associated with each barrier 50 is rotatably journaled within the associated casing in bearings formed by pillow blocks 180, which are supported upon the transverse ribs 70 and which may be secured thereto in any suitable manner. As best shown in Figure 11, each shaft 59 is formed in sections 59a and 59b, connected together by members 182 which constitute offsets, and which are keyed by keys 181 to the shaft sections. The number of offsets depends of course upon the number of arms 61 desired. In the illustrated arrangement, two connecting arms 61 are provided. The left hand end of crank shaft 59, as viewed in Figure 1, extends slightly outwardly of the end of the casing 52, which end is provided with a suitable opening to accommodate the crank shaft, and is coupled to the shaft of the drive unit 55 by a conventional flexible coupling 186. The other end of the crank shaft is adapted for corresponding connection to the crank shaft of an immediately adjacent barrier.

Referring particularly to Figures 9 and 11, each arm 61 comprises a generally U-shaped member, the free ends of the legs 188 and 190 of which are connected together by a stud 192, and are maintained in substantially parallel spaced relation by a combined spacing and bearing block 194, the curvature of the inner face of which corresponds to the curvature of the shaft portion 196 associated with the offset 182 in the crank shaft 59. The two legs 188 and 190 thus define a slot within which the shaft portion 196 may freely move relative to the arms 61 in a direction longitudinally of the latter.

The base of each U-shaped arm 61 is somewhat wider than the width of the slot provided for the shaft section 196, and this enlarged portion receives a compression spring 198, one end of which is seated against the base of the U-shaped member and the other end of which bears against a retaining plate 200. Plate 200 is threadably secured to the free end of a stud 202, which freely passes through an opening provided therefor in the base of the U-shaped member, and is provided with a head 204. Each head 204 is pivotally connected by a pin 206 to a clevis 208 either formed integrally with or suitably rigidly secured to the under side of the barrier 50.

The parts are shown in Figures 9 and 11 in the projected position, in which the offsets 182 of the crank shafts are in their extreme positions of upward barrier movement. As will be evident, rotation of crank shaft 59 in either a clockwise or a counterclockwise direction from the position shown in Figure 9, is effective to lower the barrier 50 through the connections between arm 61 and the crank shaft 59, the lowering force being transmitted through the compression springs 198. A resilient connection is thus provided between the crank shaft and the barrier. The lowering movement is also opposed by the torsion springs 63 as hereinafter more fully described.

As will also be appreciated the crank shaft position corresponding to the barrier retracted position is disposed approximately 180 degrees from the position illustrated in Figure 9. Assuming the barrier to be in the lower position, a crank shaft rotation in either direction from the retracted position is effective to permit a barrier raising movement under the force applied thereto through the torsion springs 63, as hereinafter described. Through the lost motion connection between the crankshaft portion 196 and each arm 61, the crank shaft 59 is effective to limit the rate of rise of the barrier 50, but is ineffective to cause a rising movement.

As will be further appreciated, the provision of a structure in which a complete raising and lowering cycle involves 360 degrees of crank shaft movement, avoids the necessity of providing reversing mechanism for the driving motor associated with the driving unit, and correspondingly simplifies the control and arrangement thereof.

In instances where the device remains in the retracted position for long periods of time, and under severe weather conditions, it may be expected that more or less ice will accumulate between the barrier and the casing therefor which may oppose the projecting movement of the barrier with a force in excess of the force applied thereto through the torsion springs 63. In the present construction, the arrangement is such that to initially break loose the barrier, the lifting force applied to the barrier through the torsion spring 63 is supplemented by the driving force of the drive unit. Referring particularly to Figures 1, 2, and 10, a pair of cams 210 are suitably keyed by keys 212 to the crank shaft 59 in position for cooperative engagement with seats 214 formed at the bases of the stiffening ribs 169.

Each cam 210 is provided with a major peripheral portion $a$ of uniform radius, such as to lie in slightly spaced relation to the associated foot 214 when the latter is lowered. The portion $b$, which represents an angle of between 40° and 50° is of progressively increasing radius. In the fully retracted position of the barrier, each foot 214 lies in spaced relation to portion $a$. After a cam shaft movement of a few degrees, for example, 15° to 20°, each foot 214 is engaged by the periphery of the associated cam at the low end of portion $b$. The parts are shown in Figure 10 with the foot 214 in engagement with the cam portion of maximum radius, which represents the position attained by the parts after between 55° and 70° of crankshaft travel.

In normal operation, in which the forces of the torsion springs 63 are sufficient to lift the barrier, the barrier lifting movements carry the seats 214 away from the associated cams. In instances, however, where the torsion spring forces are insufficient to lift the barrier, the seats 214 may remain in engagement with the associated cams during all or part of the 40° to 50° of crankshaft travel, represented by the angular displacement between the limits of cam portion $b$. In such instances, the cams, due to their progressively increasing radius, apply a positive upward force to the feet 214 which of course supplement the forces of the torsion springs and positively break loose the barrier. It will be appreciated that, when the thus combined forces finally overcome the resistance to motion of the barrier, the barrier will then rise to the normal position corresponding to the then angular position of the crankshaft. It will be appreciated, also, that the total change in radius of the cam 210, as well as the angular displacement between the points of minimum and maximum radius of the portion $b$ thereof of increasing radius, depends upon operating conditions and may, in certain instances, be less than the described displacement, and in other instances, may be more than the described displacement.

In the modified embodiment of Figure 10A, a bell crank 211 is suitably pivoted upon a trunnion 213, in a position to bring one end thereof in the path of the lower edge 168 of the barrier and to bring the other end thereof in the path of a cam 215 suitably keyed to the shaft 59 for rotation thereby. The relation of parts is preferably such that in the barrier retracted position bell crank 211 is slightly spaced from the base 166 and so does not interfere with resilient floating movements thereof. A short initial rotation of shaft 59 and cam 215 brings arm 211 into positive lifting relation to base 166, and continued rotation of shaft 59 forcibly moves the barrier upwardly. After a predetermined lifting movement of the barrier, proportioned to insure the "breaking loose" thereof, the cam 215 moves beyond the arm 211, permitting it to pivot relatively freely, and rendering it ineffective to interfere with a depressing movement of the barrier. Cam 215 and arm 211 are thus effective to cooperate only during a certain initial portion of an operating cycle.

As stated in the foregoing general description of operation of the device, the barriers associated with the oncoming lanes of travel are arranged to be positively locked in the fully raised positions by locking mechanism which, while ineffective during the initial raising movements of the barrier, is rendered effective as the barrier reaches its maximum height. It is preferred, however, that the barriers associated with the outgoing traffic lanes be arranged so that they may be depressed at any time, so that vehicles trapped between the incoming and outgoing barriers may pass over the outgoing barriers without substantial obstruction. In accordance with the present application, the locking mechanism for the oncoming barriers is directly controlled by the cam shaft associated with each barrier.

Referring particularly to Figs. 1, 2, 11 and 12, a pair of arms 220 and 222 are pivotally supported within each casing 51 by pins 224 and 226, which in turn are journaled in clevices 228 and 230, which may be formed integrally with or rigidly secured to the flanges of the transverse ribs 70. Both the arms 220 and 222 and the elements directly associated therewith are the same and a description of one will serve for both.

Referring particularly to Figures 11 and 12, the arm 220 is of bell crank formation, one arm thereof being provided with a roller 232, disposed to continuously engage the periphery of a cam 234 which is keyed by a key 236 to the cam shaft 59. The cam 234 is of uniform radius throughout substantially its periphery, but is provided with a portion 238 of reduced radius which registers with the rollers 232 at the angular position of the cam shaft 59 corresponding to the fully projected position of the barrier.

The arm of bell crank 220, which carries the roller 232, is also provided with a seat 240, against which one end of a compression spring 242 bears. The other end of the compression spring 242 is secured over a boss 244 formed on a rearwardly extending projection of the clevis 228. Spring 242 thus continuously urges bell crank 220 in a counterclockwise direction, as viewed in Figure 12. Except when the barrier is in the fully projected position, the portion of maximum radius of cam 234 engages roller 232 and thus retains the end 246 of bell crank 220 in a position to the right of that shown in Figure 12, in which it is inwardly spaced from the face 60 of the barrier 50. As the barrier reaches its fully projected position, however, the seat 248 provided for cooperation with the end 246 of the bell crank passes above such end. At this time also the cam portion 238 of reduced radius registers with the roller 232, permitting the bell crank 220 to be swung in a counterclockwise direction under the influence of spring 242, to the locking position shown in Figure 12, in which position, it lies directly below the barrier portion 248, and forms a positive block against downward barrier movement.

As soon as a barrier retracting movement is begun by the crank shaft 59, roller 232 is engaged by the cam portion of maximum radius, and is thereby forcibly moved to swing the bell crank 220 out of locking engagement with the face of the barrier. The very short interval of cam shaft movement which is thus necessary before the barrier is released by the bell cranks 220 and 222, is readily absorbed by the previously described springs 198 associated with the retracting arms 61.

As described generally above, it is desirable to permit the barriers associated with outgoing lanes of travel to be depressed at any time. Accordingly, it is preferred to omit the just described locking mechanism from the outgoing barriers. Moreover, as described hereinafter, it is preferred to provide mechanism to limit the travel of the outgoing barriers to an intermediate height. This limiting mechanism is preferably directly associated with the torsion springs and is described in connection therewith.

In the modified arrangement of Figure 12A, each lifting arm 221 is pivoted upon a trunnion 223 and a spring 225 is connected between the arm and the rear face of the barrier to continually urge the same in a clockwise direction to a position out of the path of the foot 248 formed in the barrier. Each arm is provided with a cam nose 227 disposed for engagement by a cam 229 suitably keyed to the crank shaft 59. During all portions of the crank shaft travel, except a limited portion, corresponding to the fully projected position of the barrier, a low portion of cam 229 is opposite the nose 227, permitting each arm 221 to occupy a retracted position. As the barrier reaches a fully projected position, however, the high point of the cam 229 engages the nose 227 and forcibly moves the associated arm 221 to the position shown in Figure 12A. The initial retracting movement of the crank shaft 59 moves the cam 229 away from the nose 227, permitting the arm 221 to be retracted. As in the arrangement of Figure 12, the resilient connection between the retracting arms 61 and the barrier (Figure 11) permits the barrier to remain in the fully projected position until the crank shaft 59 has rotated far enough to release the locking arms.

*Torsion spring lifting mechanism and travel limiting mechanism—Figs. 1, 2, 13, 14, 15, 16, 17 and 18*

Referring particularly to Figures 1, 2, and 13 through 18, two of the torsion springs 63 are shown as connected between the barrier 50 and the casing 52 for forcibly projecting the barrier to the raised position. The construction and arrangement of both of the springs 63 is the same, so that the description of one will serve for both. It will be understood also that, in a broad sense, a greater number or a lesser number of the springs may be utilized.

Considering particularly the left hand spring 63 of Fig. 15, the right hand end thereof is rotatably supported upon a hub 260 shown as formed integrally with the reduced rearward portion 262 of one of the ribs 70 (Figure 1). The left hand end of the just mentioned spring 63 is rotatably supported on a hub 264 which forms part of a generally triangularly shaped lifting bracket designated as a whole as 266. The hub 264 is rotatably journalled upon a trunnion 268 which is shown as formed integrally with a bracket 270 which is rigidly secured as by the studs 272 to the rear wall 74 of the casing 52. Certain of the studs 272 also support a spring protective apron 273.

The end 276 of spring 63 is connected to the rear wall 74 of casing 52 by a link 278 of adjustable length. One end of the link 278 is provided with the loop 280 which passes over the free end of the spring, and the other end of the link 278 is threaded for cooperation with an adjusting nut 282. The adjusting nut 282 is provided with a tubular shank portion 284, of sufficient length to extend all of the way through the opening 286 formed in the base of the casing, and so protects the threads of the stud 278. The head of the nut 282, as it will be appreciated, is sufficiently large to have a bearing engagement with the rim of the opening 286.

The back 290 of the triangular lifting bracket 266 is of channel formation, and the upper left hand corner thereof, as viewed in Figure 13, forms a clevis 292, in which a pin 294 is journaled, which pin forms a pivotal connection between the associated lifting arm 296 and the lifting bracket 266. The channel formation of the back 290 also forms a clevis which supports a pin 298, over which the remaining free end 300 of the associated spring 63 is hooked. Preferably, and as illustrated, the just mentioned clevis portion of each lifting bracket 266 is provided with additional cutouts, such as 302, which may in certain instances be provided with pins to replace the pin 298 and provide a substantial adjustment of the initial torsional stress to which the associated lifting spring is subjected. This adjustment may, as will be appreciated, be refined by suitably adjusting the nut 282 associated with the link 278, which connects the other end of each spring to the housing.

The left hand flange 304 of the channel shaped back 290, as viewed in Figure 16, is extended to give the bracket its triangular shape and forms the connection between the back portion 290 and the previously mentioned spring carrying hub 264.

Each arm 296, which forms a connection between the lifting bracket 266 and the barrier, is of a link formation and comprises a boss 310 formed integrally at one end thereof for cooperation with the previously mentioned connecting pin 294, and a second boss 312, resiliently connected to the other end of the arm. The boss 312 is connected by a pin 314 to a clevis 316 provided therefor in the barrier 50. The shank 318 of each boss 312 is slidably received in an opening 320 provided therefor in the end of the arm 296. A compression spring 322 surrounds each shank 318, and is seated between an adjustable nut 324 carried by the latter, and the end of the arm 296. The nut 324 is provided with ears 325 which protrude from either side of the arm 296 and prevent turning thereof. The upper end of each arm 296 abuts the lower surface of the connecting boss 312, so that a positive driving connection is provided between each lifting bracket 266 and the barrier 50.

As will be appreciated, each retracting movement of the barrier 50 under the influence of the crank shaft 59 and the associated connecting arms 61, as previously described, forces the lifting arms 296 downwardly, correspondingly rotating the lifting brackets 266 in a counterclockwise direction, as viewed in Figure 13, and winding up the torsional springs 63 to thereby load the springs. On the other hand, rotation of crank shaft 59 throughout the lifting part of its travel relieves the downward force on the barrier, and permits the torsion springs 63 to unwind under the influence of the previously applied stress, forcing the lifting brackets 266 in a clockwise direction, as viewed in Figure 13, and correspondingly forcing the arms 296 and barrier 50 in the upward direction. The resilient connection between the lifting arms 296 and the bosses 312 associated therewith is useful in preventing sudden jars or impacts against the barrier 50 when in a raised position, from being transmitted directly to the lifting brackets 266. This resilient connection, however, is of particular value where it is desired to provide means for positively limiting the rotation of the lifting brackets 266, as where it is desired to limit the lifting movement of the barriers to a point lower than would be permitted by the travel of the crank shaft 59 and connecting arms 61.

In accordance with the present construction, this supplemental upward movement limiting mechanism is applied to the barriers associated with the outgoing lanes of travel, in order to limit the travel thereof to an intermediate height. This limiting mechanism may, however, be applied to the barriers associated with the oncoming lanes of travel, and so adjusted as to permit the barriers to rise to the full height.

Referring particularly to Figure 14, a relatively heavy U-shaped member 330 is associated with each torsional spring 63. The flanges of each member 330 are connected to associated ones of the transverse ribs 70 by studs 332. Preferably also at least one of the flanges associated with each U-shaped bracket is turned over, as indicated at 334, to cooperate with the base of the associated transverse rib 70 and supplement the securing effect of the studs 332. The web 336 of each U-shaped member 330 is disposed for engagement by the portion 304 of the associated lifting bracket 266 when the latter has rotated to the desired degree, and so forms a positive limit to further movement thereof. It will be evident that the stop members 330 may be adjusted to limit the travel of the associated barrier to any desired degree. Preferably, in association with the outgoing barriers, the member 330 limits the rise thereof to approximately two thirds the rise of the barriers associated with the on-coming lanes of travel.

After a barrier's raising movement has been stopped by the stop member 330, any impact or external force applied thereto, tending to cause a further upward movement thereof, is absorbed by the resilient connections between the lifting arms 296 and the associated bosses 312 provided by springs 322.

As will be appreciated, the pins 206 associated with arms 61, and the pins 314 associated with arms 296, are readily removable, to thereby disconnect the barrier 50 from the crank shaft 59 and from the torsion spring mechanism, and permit it to be freely rotated to a position to afford ready access to the interior of the structure from above. To afford access to the pins 206 and 314 when the barriers are retracted, a plurality of hand openings 315, closable by removable plates 317, are preferably provided at appropriate points in the barrier upper surface (Fig. 13).

*Snubber mechanism—Figures 1 and 19*

In practice, the projecting movements of the barriers are usually begun when the train or other vehicle, the approach of which may be relied upon to actuate the barriers, is a substantial distance away from the crossing to be protected. This initial movement may be expected to occur at a time when highway vehicles are too close to the barriers to permit a normal stop thereof. To enable such vehicles to pass over the partially raised barriers, the previously described provisions for depressing the barriers against the forces of the torsional lifting springs, and independently of the angular positions of the barrier crank shafts, is very desirable if not essential. Similarly, it may occur from time to time that a vehicle will be trapped between the barriers at either side of an intersection or crossing and in such instances, it is desirable that the barrier construction permit such trapped vehicle to depress the barriers and pass thereover without substantial obstruction.

While it is desirable, under the conditions above mentioned, that vehicles be able to depress the barriers rapidly and without a too great resisting force therefrom, it is equally desirable to retard the return movements to the raised positions of the barriers, after being depressed. In the absence of a retarding mechanism, substantial injury to the under frame portions of the depressing vehicles may occur.

With the above considerations in mind, a feature of the present construction resides in the association with the barrier of snubber or motion checking mechanism, so connected thereto as to permit a free and unimpeded depressing movement, but to limit the return or raising movement of the barriers to a predetermined value. This predetermined rate of return movement preferably is not greatly in excess of the normal rate of rise as provided by the barrier crank shaft in the normal raising motion of the barriers. Preferably, the snubber is connected directly between each barrier and the associated casing, although, in a broad sense, other relationships are practical.

In the broader aspects of the present invention, the snubber mechanism may be constructed in various ways, but a construction which is preferred is shown in Figure 19 as comprising a fluid pressure device 381, the cylinder member 383 of which is suitably pivotally connected to the base of the barrier casing 52 and the piston rod 385 of which is correspondingly pivotally connected to the under side of the barrier 50. The cylinder 383 is preferably substantially filled with a suitable fluid such as oil and communication between the cylinder portions on opposite sides of the piston 387 is afforded by a connecting line 389. Line 389 communicates with the upper end of cylinder 383 through an adjustable needle valve 391 and a check valve 393. Similar communication between the line 389 and the lower end of cylinder 383 is afforded by an adjustable needle valve 395 and a check valve 397. The check valves 393 and 397 are arranged to open in response to a pressure tending to permit flow therethrough into the cylinder, but to close and prevent a flow therethrough out of the cylinder into the line 389.

With the just described arrangement, it will be appreciated that during a projecting movement of the barrier 50, the piston 387 moves upwardly in the cylinder 383, causing the fluid to discharge from the upper part of the cylinder and flow through the line 389 into the lower portion of the cylinder. In this instance, the check valve 393 occupies a closed position and the valve 397 occupies an open position. The rate of flow and consequently the rate of movement of the barrier 50 is thus determined by the adjustment of the needle valve 391. During reverse movement, on the other hand, the check valve 393 is open and the check valve 397 is closed, the rate of downward movement of the barrier accordingly being limited by the adjustment of the needle valve 395. The rates of raising and lowering movements as controlled by the snubbber 381 may therefore be independently adjusted by independently adjusting the needle valves 391 and 395, so as to afford either an unimpeded movement in the retracting direction accompanied by an impeded movement in the projecting direction, or so as to afford a desired impedance in both directions.

*Summary of operation as a whole*

Summarizing the operation of the system as a whole, all of the barriers at protective crossings normally occupy the retracted positions in which the upper barrier surfaces lie flush with the supporting roadway and act as continuations thereof, and in which positions they are held by brakes associated with the drive units. In response to the approach of a train or other vehicle to the crossing to be protected, the motor 57 of the drive unit 55, one of which is provided at each side of the crossing, starts in operation, initiating a projecting movement of the barriers connected thereto. The projecting movement occurs due to the force directly applied to the barriers through torsion springs 63 individual thereto, but at a rate determined by the rate of angular movement of the crank shaft 59 of the barriers. In the event that the lifting forces applied to the barriers through the torsion springs are ineffective to cause an upward movement thereof, as in instances where ice has collected within the barriers, the ice breaking cams 210 carried by the crank shafts supply positive lifting forces to the barriers through the cooperating feet 214 provided on the barrier ribs.

When the barriers reach an intermediate height, which may be called a warning height, the controller 65 associated with each drive unit 55, automatically brings the associated motor 57 to rest, correspondingly stopping the barriers connected thereto. The brake elements associated with each drive motor 57 retain the barriers in positions of rest against the lifting forces of the torsion springs.

At the expiration of a predetermined interval, determined by the timing mechanism associated with the controller 65, each motor 57 is again automatically started and permits the barrier projecting movement to be continued to a limit position under the influence of the torsion springs 63. The barriers associated with the on coming traffic lanes are permitted to continue to a maximum projected height, in which position they are automatically locked against downward movement by the locking arms 220 and 222. The barriers associated with the outgoing lanes of travel are preferably interrupted at a height intermediate the warning height and the just identified maximum height, this interruption being provided by the stopping members 330, which engage the lifting bracket 266 associated with the torsion springs 63.

The on-coming and outgoing barriers thus occupy the last mentioned projected positions thereof as long as the vehicle which initiated their operation remains within a predetermined block associated with the intersection. As soon as the actuating vehicle passes beyond such block, the motors 57 associated with the barriers at the opposite sides of the intersection are again placed in operation, rotating in the same direction, and act through the arms 61 associated with the crank shafts 59, to forcibly retract the barriers against the forces of the torsion springs 63. When the barriers reach the original retracted positions, the motors 57 are again stopped and the brake elements thereof automatically applied, and so retain the barriers in the retracted position against the forces of the torsion springs 63.

As an incident to the actuation of the barriers, the warning light systems associated therewith are automatically placed in operation in accordance with the disclosure of the previously identified application, Serial No. 108,150 filed October 29, 1936, and serve to provide an effective warning of the barrier action.

The lost motion connections between each crank shaft lifting arm 61 and the associated crank shaft 59 permit the outgoing barriers to be forcibly depressed against the forces of the torsion springs 63 at any stage in the movement thereof, and permit the oncoming barriers to be depressed except at such times as the locking arms 220 and 222 are in locking position. The depressing movements of the barriers are unimpeded by the snubber mechanism, but the return movements thereof are maintained at a low rate, commensurate with the normal rate of rise thereof. Vehicles too close to the barriers to permit a normal stop thereof at the time the upward movement thereof is begun, as well as vehicles trapped between the barriers, are permitted to pass thereover without substantial obstruction.

In view of the resilient floating connections between each barrier 50 and the associated casing, provided by the springs 108, 113, 120, and 134 and 136, as well as by the buffer plates 76, each barrier 50 is normally supported in slightly spaced relation from the rear, front and end walls of the associated casing. The just identified springs also resiliently oppose any vertical, transverse, or longitudinal impact forces to which a barrier is subjected. In the event such forces are of sufficient magnitude to overcome the spring resisting forces and cause substantial movements of the barriers within the casings, the barriers are brought into engagement with abutments provided in the associated casings, and such forces are therefore transmitted through such abutments directly between the barriers and the casings.

*Modified weight operated barrier lifting mechanism—Figures 20 and 21*

In the arrangement shown in Figures 20 and 21, the torsion springs 63, described with reference to the preceding figures, are replaced by a plurality of weights 380, suitably and removably carried by a bar 382, which extends longitudinally of the barrier 50a. The cross bar 382 is supported adjacent each end by vertical links 384, and is positioned between a stop 386 on each arm and a securing nut 388 thereon, by opposed compression springs 390.

The upper end of each connecting link 384 is formed as a clevis 392, by which, through a pin 394, it is pivotally connected to one arm of a centrally pivoted lifting member 396. Each lifting member 396 is pivotally connected at an intermediate point thereof, by a pin 398, to a bracket 400 which is suitably rigidly secured to the rear wall of the casing 52a. The other end of each arm 396 is connected through a pivotal link 402 to the barrier 50a.

With this construction, it will be appreciated that the weights 380 apply a continuously acting lifting force to the barrier 50a, in a manner which, in a broad sense, is the equivalent of the lifting force applied thereto by the previously described torsion springs 63. In the operation of the embodiments of Figures 20 and 21, accordingly, rotation of the crank shaft 59a, which is constructed and arranged in the manner described with reference to the preceding figures, and is correspondingly associated with the barrier 50a and the retracting arm 61a, permits the barrier to be lifted by the force applied thereto by the weights 380 in substantially the manner described hereinbefore. In all respects, excepting the substitution for the springs 63 of the weights 380 and associated connecting links, as just described, the embodiment of Figures 20 and 21 preferably follows the construction of the preceding figures.

Although specific embodiments of the present invention have been described, it will be evident that various modifications in the form, number and arrangement of parts may be made within the spirit and scope of the invention.

What is claimed is:

1. In a protective system, a barrier, means for supporting said barrier for movement between a retracted and a projected position, continuously acting means for urging and effective to move said barrier to the projected position, a crank shaft, means connecting said crank shaft to said barrier, said crank shaft serving to retract said barrier to the retracted position against the force of said continuously acting means, and means for locking said crank shaft in a position corresponding to the retracted position of said barrier.

2. In a protective system, a barrier, means for supporting said barrier for movement between a retracted and a projected position, continuously acting means for urging said barrier toward the projected position, a crank shaft, means including an arm connecting said crank shaft to said barrier by a lost motion connection, said crank shaft serving to retract said barrier to the retracted position against the force of such continuously acting means, and said lost motion connection serving to permit retraction of said barrier independently of the position of said crank shaft.

3. In a protective device, a barrier, means for supporting said barrier for movement between a retracted and a projected position, a crank shaft, means including an arm for forming a lost motion connection between said crank shaft and said barrier, said connection rendering said crank shaft effective to move said barrier from the projected to the retracted position, and additional means for urging said barrier toward the projected position.

4. In a protective system, a barrier, means for supporting said barrier for movement between a projected and a retracted position, continuously acting means acting between said barrier and said supporting means for moving said barrier toward the projected position, means including a drive member connected to said barrier for retracting said barrier to the retracted position against the force of said continuously acting means, and additional means actuated by said drive means for supplementing the effect of said continuously acting means to break said barrier loose from the retracted position.

5. In a protective system, a barrier, means for supporting said barrier for movement between a projected and a retracted position, continuously acting means acting between said barrier and said supporting means for moving said barrier toward the projected position, means including a drive member connected to said barrier for retracting said barrier to the retracted position against the force of said continuously acting means, and means including a cam actuated by said drive means and coacting with said barrier to supplement the effect of said continuously acting means to break said barrier loose from the retracted position.

6. In a protective device, a barrier, means for supporting said barrier for movement between a retracted and a projected position, means acting on said barrier to urge and effective to move the same to the projected position, additional means acting on said barrier and effective to retract the same against the force of said first mentioned means, and locking means actuated by said additional means and effective to lock said barrier in the projected position.

7. In a protective system, a barrier, means for supporting said barrier for movement between a projected and a retracted position, continuously acting means for urging said barrier to the projected position, means including a drive shaft connected to said barrier for retracting said barrier against the force of said continuously acting means, and means including a swingable arm actuated by said drive shaft when said barrier approaches a projected position for movement into blocking relation to said barrier to lock the same in projected position.

8. In a protective system, a barrier, means for supporting said barrier for movement between a projected and a retracted position, continuously acting means for urging and effective to move said barrier to a projected position, means including a drive member having a lost motion connection with said barrier for retracting said barrier against the force of said continuously acting means, said lost motion connection permitting a retraction of said barrier independently of said drive means, and means including a snubber connected between said barrier and said supporting means for limiting the rate of rise of said barrier.

9. In a protective system, a selectively projectable and retractable barrier, a casing for supporting said barrier adapted to be imbedded in a roadway; means for pivotally mounting said barrier in said casing, including hinge mechanism disposed to resiliently oppose forces acting on said barrier; means including a plurality of weighted elements; a plurality of links for connecting said elements to said barrier to render said elements effective to continuously urge said barrier to the projected position; a crank shaft; a plurality of resiliently constructed arms forming a lost motion connection between said crank shaft and said barrier for rendering said crank shaft effective to retract said barrier against the force of said weighted elements, and for permitting a retracting movement of said barrier independently of the position of said crank shaft; snubber mechanism acting between said barrier and said casing for limiting a projecting movement of said barrier; and control mechanism for said barrier including means to rotate said drive shaft and to lock said drive shaft in any one of a plurality of rotative positions.

10. In a protective device, a casing, a barrier, means for movably supporting said barrier in said casing for actuation from a retracted to a projected position, continuously acting means for applying a force to said barrier sufficient to move said barrier toward said projected position, a drive member mounted in said casing, connections between said member and said barrier enabling said member upon actuation to move said barrier to the retracted position and hold it in such retracted position against the force of said continuously acting means but enabling said barrier to be retracted independently of the position of said member, means for actuating said drive member, and a snubber connected between said barrier and said casing for limiting the rate of movement of said barrier in at least one direction.

11. In a protective device, a casing, a barrier, means for movably supporting said barrier in said casing for actuation from a retracted to a projected position, continuously acting means for applying a force to said barrier sufficient to move said barrier toward said projected position, a drive member mounted in said casing, connections between said member and said barrier enabling said member upon actuation to move said barrier to the retracted position and hold it in such retracted position against the force of said continuously acting means but enabling said barrier to be retracted independently of the position of said member, means for actuating said drive member, and a snubber connected between said barrier and said casing for limiting the rate of projecting movement of said barrier after a said independent retracting movement.

SULO M. NAMPA.